United States Patent [19]
Arruza

[11] Patent Number: 5,838,316
[45] Date of Patent: Nov. 17, 1998

[54] METHOD AND SYSTEM FOR PRESENTING A PLURALITY OF ANIMATED DISPLAY OBJECTS TO A USER FOR SELECTION ON A GRAPHICAL USER INTERFACE IN A DATA PROCESSING SYSTEM

[75] Inventor: Bernabe J. Arruza, Boca Raton, Fla.

[73] Assignee: International Business Machines Corporation, Armonk, N.Y.

[21] Appl. No.: 592,147

[22] Filed: Jan. 26, 1996

[51] Int. Cl.⁶ .................................................. G06F 15/00
[52] U.S. Cl. ...................... 345/334; 345/339; 345/349; 345/977
[58] Field of Search ........................... 395/326, 333, 395/334, 339, 349, 173, 977

[56] References Cited

U.S. PATENT DOCUMENTS

| | | | |
|---|---|---|---|
| 5,498,002 | 3/1996 | Gechter | 273/434 |
| 5,517,663 | 5/1996 | Kahn | 395/800 |
| 5,524,195 | 6/1996 | Clanton, III et al. | 395/155 |
| 5,613,056 | 3/1997 | Gasper et al. | 395/2.85 |
| 5,630,017 | 5/1997 | Gasper et al. | 395/2.85 |
| 5,630,117 | 5/1997 | Oren et al. | 395/602 |

*Primary Examiner*—Raymond J. Bayerl
*Assistant Examiner*—U. Chauhan
*Attorney, Agent, or Firm*—Mark S. Walker; Brian F. Russell; Andrew J. Dillon

[57] ABSTRACT

A computer program product for presenting animated display objects to a user for selection on a graphical user interface of a data processing system is provided. A plurality of animated display objects are simultaneously displayed by a graphical user interface on a display device of the data processing system, thus allowing the user to view all of the plurality of animated display objects and make a selection of one of the plurality of animated display objects. One of the displayed animated display objects is selected, and a multimedia presentation associated with the selected animated display object is played.

24 Claims, 5 Drawing Sheets

METHOD AND SYSTEM FOR PRESENTING A PLURALITY OF ANIMATED DISPLAY OBJECTS TO A USER FOR SELECTION ON A GRAPHICAL USER INTERFACE IN A DATA PROCESSING SYSTEM

BACKGROUND OF THE INVENTION

1. Technical Field

The present invention relates in general to a method and system for presenting data on a graphical user interface in a data processing system, and in particular to a method and system for presenting a plurality of animated display objects to a user for selection on a graphical user interface in a data processing system. Still more particularly, the present invention relates to a method and system of playing multimedia presentations of a plurality of animated display objects presented to a user and allowing user selection from among the plurality of animated display objects on a graphical user interface in a data processing system.

2. Description of the Related Art

The user interface for a personal computer defines how the user communicates with the computer. This communication link defines how applications are used, how tasks are switched, and how choices are made. Years ago, computers were used, almost exclusively, by highly skilled professionals for very specific engineering, scientific, or business tasks. The user interface was not intuitive, and frequently required special training. The extra training was acceptable since the applications were so crucial to these professions. Today, computer applications are used by all segments of the population. Thus, easier and more intuitive user interfaces have been necessary to reduce the specialized training required to operate computers.

Most first time users of computers are not as familiar with keyboards as they are familiar with looking at pictures, pointing to objects, grabbing and moving items. Thus, to really capture the creative powers of users, and to enable even children to use the computer, graphical user interfaces (GUI) were developed. By using a mouse to point to objects on a display, represented by small images (icons), a user could control the computer without knowing any complex commands. The mouse controlled graphical interface allowed the user to point to icons representing programs and group those icons into window frames. Teaching new computer users how to use the computer to accomplish tasks that used to be performed at a desk with paper and pen is made easier with the use of a "Desktop" metaphor for a GUI. The metaphor helps bridge users from the past methods to the computer. The Desktop display works quite well for the business and personal uses of a computer which assisted tasks that were traditionally performed on the desktop.

One modern tool in computer software is the use of intelligent agents (agents) to assist computer users in taking full advantage of the features of their systems and to complete their tasks in a minimum amount of time. Computer agents are software programs that interact with the user (computer, computer network, etc.) to help complete a software task. Agents may act in the foreground where they are visually shown to the user, or they may operate in the background as tasks implemented in software code. An agent may assist a user as a foreground agent in navigating through windows or may help the user as a background agent to look up particular data in a database, such as a phone book.

Configuration agents operate to configure the GUI into a particular configuration. Such an agent may configure the controls on a mouse or keyboard to affect the "feel" of the devices, and may change the placement of icons, the color selected for objects on the screen, and the types of paths and movements allowed in a particular GUI format. It is desirable to have an operating system that takes into account the many types of behavioral characteristics from the population of potential computer users and to provide those users the option of selecting a configuration agent that best matches their personality or current state of mind. However, to make such a selection, the user will need to be informed of all available agent's characteristics. In other words, there needs to be a way of introducing the agents to the user.

There are known some systems that introduce agents to the user through the use of a notebook type control. The user has to flip through the pages of the notebook control to locate and choose one of the many agents being offered. Each page shows an agent and its various characteristics. This is not a very practical way of presenting choices to a user because it is difficult for the user to keep track of all the agents being introduced. When many agents are provided by the notebook, the user may have difficulty remembering where to find a particularly favorable agent. Also, the user has very little control over the sequence agents are shown. It can be seen that the kind of presentation scheme enforced by the notebook metaphor encourages the user to settle for the first entry he sees. What is needed is a method and system for presenting agents to the user that encourages the user to explore all the potential agents. Moreover, it would be desirable to provide such a method and system whereby it is simple for a user to remember all the selection options, and further whereby it is simple to access an agent for selection.

SUMMARY OF THE INVENTION

A method, system and computer program product for presenting animated display objects to a user for selection on a graphical user interface of a data processing system is provided. A plurality of animated display objects are simultaneously displayed by a graphical user interface on a display device of the data processing system, thus allowing the user to view all of the plurality of animated display objects and make a selection of one of the plurality of animated display objects. One of the displayed animated display objects is selected, and a multimedia presentation associated with the selected animated display object is played.

The above as well as additional objects, features, and advantages of the present invention will become apparent in the following detailed written description.

BRIEF DESCRIPTION OF THE DRAWINGS

The novel features believed characteristic of the invention are set forth in the appended claims. However, the invention, as well as a preferred mode of use, and further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
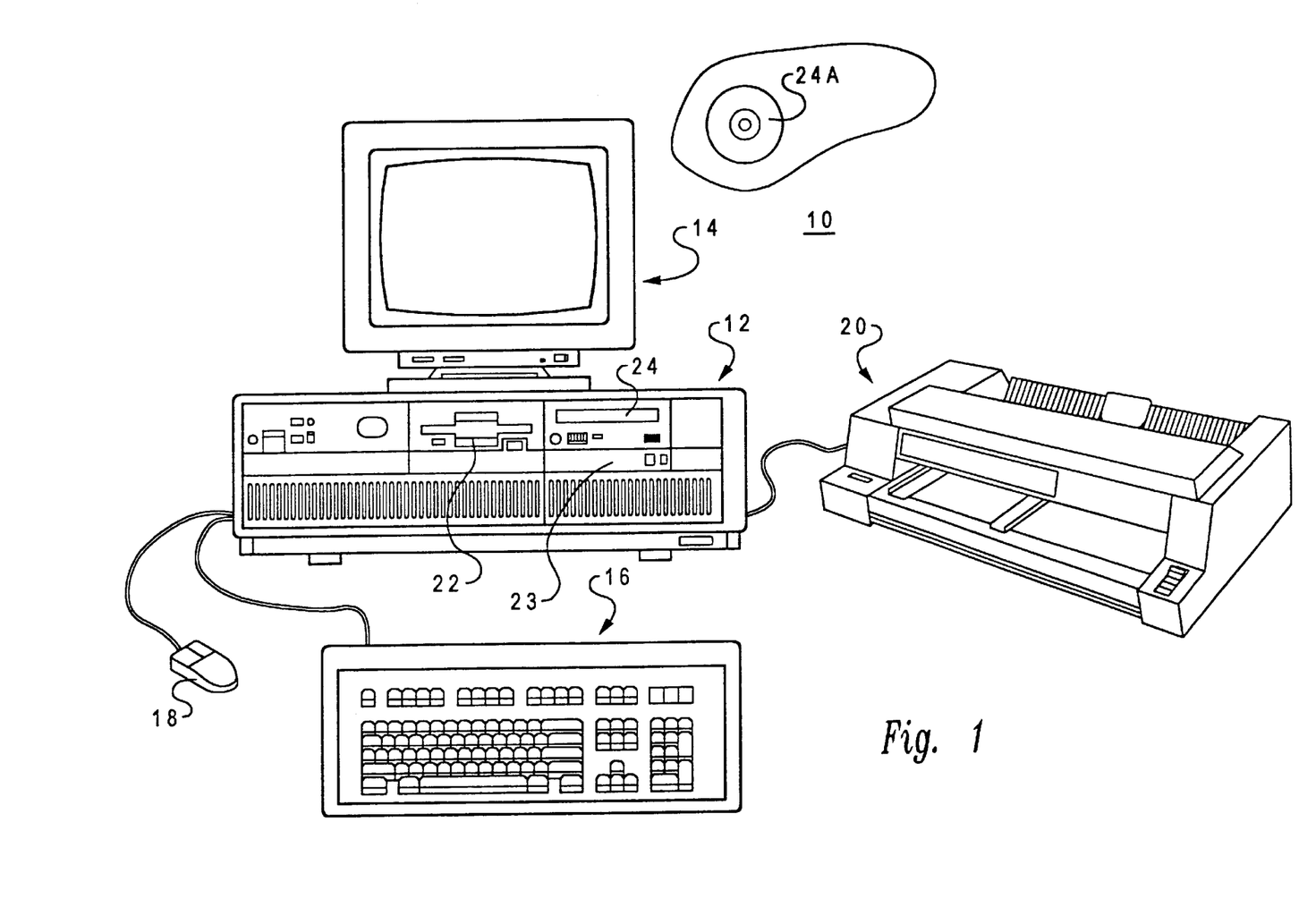
FIG. 1 illustrates a preferred embodiment of a data processing system which may be utilized to implement the present invention.

With reference now to the figures and in particular with reference to FIG. 1, there is illustrated a preferred embodiment of a data processing system which may be utilized to implement the present invention. As illustrated, data processing system 10 includes system unit 12, display device 14, keyboard 16, mouse 18, and printer 20. As is well-known in the art, system unit 12 receives data from input devices such as keyboard 16, mouse 18, or networking/telecommunication interfaces (not illustrated). Mouse 18 is preferably utilized in conjunction with a graphical user interface (GUI) in which system objects, including data processing system components and application programs, may be manipulated by mouse 18 through the selection and movement of associated graphical objects displayed within display device 14. To support storage and retrieval of data, system unit 12 further includes diskette drive 22, hard disk drive 23, and CD-ROM drive 24 all of which are connected to system unit 12 in a well-known manner. Those skilled in the art are aware that other conventional components can also be connected to system unit 12 for interaction therewith.

Figure 2:
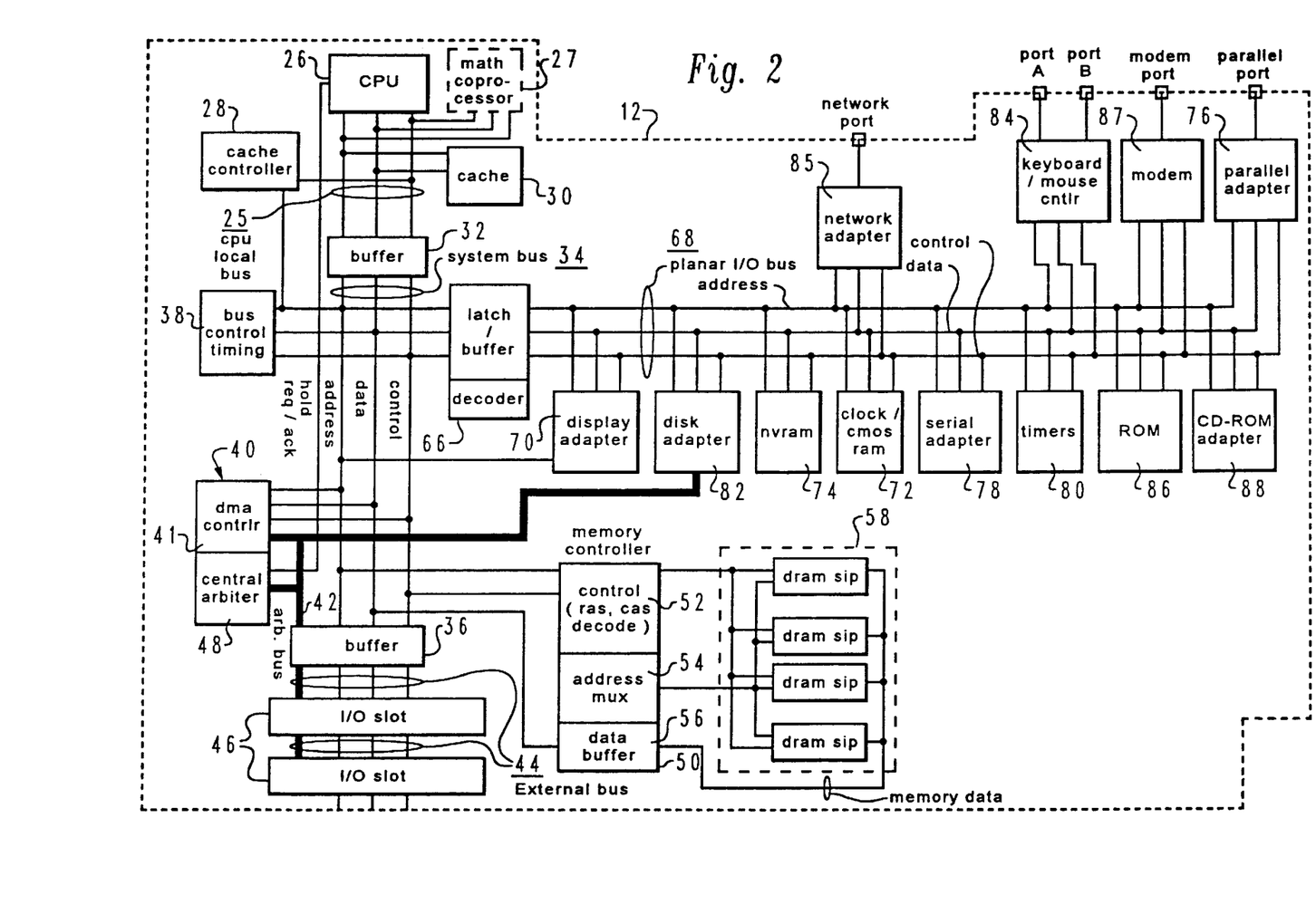
FIG. 2 depicts a block diagram of the principal components of the system unit in the data processing system in accordance with a preferred embodiment of the present invention.

Referring now to FIG. 2, there is depicted a block diagram of the principal components of system unit 12 in data processing system 10. As illustrated, system unit 12 includes a central processing unit (CPU) 26 which executes software instructions. While any appropriate microprocessor can be utilized for CPU 26, CPU 26 is preferably one of the PowerPC™ line of microprocessors available from IBM Microelectronics. Alternatively, CPU 26 could be implemented as one of the 8OX86 line of microprocessors, which are available from a number of vendors.

In addition to CPU 26, an optional math coprocessor 27, cache controller 28, and cache memory 30 are coupled to a high-speed CPU local bus 25. Math coprocessor 27 is an optional processor, distinct from CPU 26, that performs numeric calculations with greater efficiency than CPU 26. Cache memory 30 comprises a small high-speed memory which stores frequently accessed data and instructions. The operation of cache 30 is controlled by cache controller 28, which maintains a directory of the contents of cache 30 and enforces a selected cache coherency protocol.

CPU local bus 25 is coupled to buffer 32 to provide communication between CPU local bus 25 and system bus 34, which extends between buffer 32 and a further buffer 36. System bus 34 is connected to bus control and timing unit 38 and direct memory access (DMA) unit 40, comprising central arbiter 48 and DMA controller 41. DMA controller 41 supports memory accesses that do not involve CPU 26. Direct memory accesses are typically employed to transfer data directly between RAM 58 and an "intelligent" peripheral device, such as disk adapter 82. DMA requests from multiple peripheral devices are arbitrated by central arbiter 48. As described below, central arbiter 48 also regulates access to devices coupled to Micro Channel bus 44 by control signals transmitted via arbitration control bus 42.

CPU 26 accesses data and instructions from and stores data to volatile random access memory (RAM) 58 through memory controller 50, which comprises memory control unit 50, address multiplexer 54, and data buffer 56. Memory control unit 52 generates read enable and write enable signals to facilitate storage and retrieval of data and includes address translation facilities that map virtual addresses utilized by CPU 26 into physical addresses within RAM 58. As will be appreciated by those skilled in the art, RAM 58 comprises a number of individual volatile memory modules which store segments of operating system and application software while power is supplied to data processing system 10. The software segments are partitioned into one or more virtual memory pages which each contain a uniform number of virtual memory addresses. When the execution of software requires more pages of virtual memory that can be stored within RAM 58, pages that are not currently needed are swapped with the required pages, which are stored within secondary storage, such as hard disk drive 23, which is controlled by disk adapter 82.

Memory controller 50 further includes address multiplexer 54, which selects particular addresses within RAM 58, and data buffer 56, which buffers data read from and stored to RAM 58. Memory controller 50 also provides memory protection that isolates system processes and user processes within the virtual address space allocated to each process. Thus, a program running in user mode can access only memory allocated to its virtual address space; the user mode program cannot access memory within another process's virtual address space unless memory sharing between the processes is supported and the program has the appropriate privileges for the access.

Still referring to FIG. 2, buffer 36 provides an interface between system bus 34 and an optional feature bus such as Micro Channel bus 44. Connected to Micro Channel bus 44 are a number of I/O slots 46 for receiving Micro Channel adapter cards which may be further connected to an I/O device or memory. Arbitration control bus 42 couples DMA controller 41 and central arbiter 48 to I/O slots 46 and disk adapter 82. By implementing the Micro Channel architecture bus arbitration protocol, central arbiter 48 regulates access to Micro Channel bus 44 by extension cards, controllers, and CPU 26. In addition, central arbiter 44 arbitrates for ownership of Micro Channel bus 44 among the bus masters coupled to Micro Channel bus 44. Bus master support allows multiprocessor configurations of Micro Channel bus 44 to be created by the addition of bus master adapters containing a processor and its support chips.

System bus 34 is coupled to planar I/O bus 68 through buffer 66. Attached to planar I/O bus 68 are a variety of I/O adapters and other peripheral components, including display adapter 70, disk adapter 82, nonvolatile RAM 74, clock 72, serial adapter 78, timers 80, read only memory (ROM) 86, CD-ROM adapter 88, network adapter 85, keyboard/mouse controller 84, modem 87 and parallel adapter 76. Display adapter 70 translates graphics data from CPU 26 into RGB video signals utilized to drive display device 14. Depending upon the operating system and application software running, the visual output may include text, graphics, animation, and multimedia video. Disk adapter 82 controls the storage of data to and the retrieval of data from hard disk drive 23 and diskette drive 22. Disk adapter 82 handles tasks such as positioning the read/write head and mediating between the drives and CPU 26. Non-volatile RAM 74 stores system configuration data that describes the present configuration of data processing system 10. For example, nonvolatile RAM 74 contains information that describes the capacity of hard disk drive 23 or a diskette placed within diskette drive 22, the type of display device 14, the amount of free RAM 58, and the present system configuration. These data are stored in non-volatile RAM when power is removed from data processing system 10.

Clock 72 is utilized by application programs executed by CPU 26 for time and day calculations. Serial adapter 76 provides a synchronous or asynchronous serial interface with external devices through a serial port (not shown), which enables data processing system 10 to transmit information to/from a serial communication device. Timers 80 comprise multiple interval timers which may be utilized to time a number of events within data processing system 10. As described above, timers 80 are among the devices directly controlled by some application programs, particularly games, which were written for a single-threaded operating system environment.

ROM 86 typically stores a basic input/output system (BIOS) which provides user-transparent I/O operations when CPU 26 is operating under the DOS operating system. BIOS also includes power on self-test (POST) diagnostic routines which perform system set-up at power on. For example, POST interrogates hardware, allocates a BIOS data area (BDA), constructs an interrupt vector table to point to interrupt handling routines within ROM 86, and initializes timers 80, clock 72 and other devices within system unit 12. CD-ROM adapter 88 controls the retrieval of data from CD-ROM drive 24, and CD-ROM 24A.

Parallel adapter 76 enables system unit 12 to output data in parallel to external devices such as printer 20 through a parallel port. Keyboard/mouse controller 84 interfaces system unit 12 with keyboard 16 and a pointing device, such as mouse 18. Such pointing devices are typically utilized to control an on-screen element, such as a graphical pointer that specifies the location of the pointer when the user presses a mouse button. Other pointing devices include a graphics tablet, stylus, light pen, joystick, puck, trackball, trackpad, and the pointing device sold by IBM under the trademark "TrackPoint".

Finally, system unit 12 includes network adapter 85 and modem 87, which facilitate communication between data processing system 10 and other data processing systems, including computer networks. Network adapter 85 is utilized to connect data processing system 10 to a computer network such as a local area network (LAN) connected to the network port. Computer networks support electronic transmission of data electronically over the network connection. Networks also support distributed processing, which enables data processing system 10 to share a task with other data processing systems linked to the network. Modem 87 provides modulation and demodulation of analog data communicated over a telecommunication line from and to a digital form. For example, a modem may be utilized to connect data processing system 10 to an on-line information service, such as the information service provided by Prodigy Services Corporation under the service mark "PRODIGY". Such on-line service providers offer software and data that can be downloaded into data processing system 10 via the modem. Furthermore, telephone communication through modem 87 provides a connection to other sources of software, such as a server, an electronic bulletin board, and the Internet or "World Wide Web".

As described in detail below, aspects of the present invention pertain to specific methods or functions implementable on computer systems. These aspects of the present invention may be implemented as a computer program product for use with a computer system. Those skilled in the art should readily appreciate that computer programs defining the functions of the present invention can be delivered to a computer in many forms, which include, but are not limited to: (a) information permanently stored on non-writable storage media (e.g. read only memory devices within a computer such as ROM 86 or CD-ROM disks readable by a computer I/O attachment such as CD-ROM drive 24); (b) information alterably stored on writable storage media (e.g., floppy disks within diskette drive 22 or hard disk drive 23); or (c) information conveyed to a computer through communication media, such as through a computer network attached to network adapter 85 or a telecommunication line attached to modem 87. It should be understood, therefore, that such media, when carrying computer readable instructions that direct the method-functions of the present invention, represent alternate embodiments of the present invention.

Figure 3:
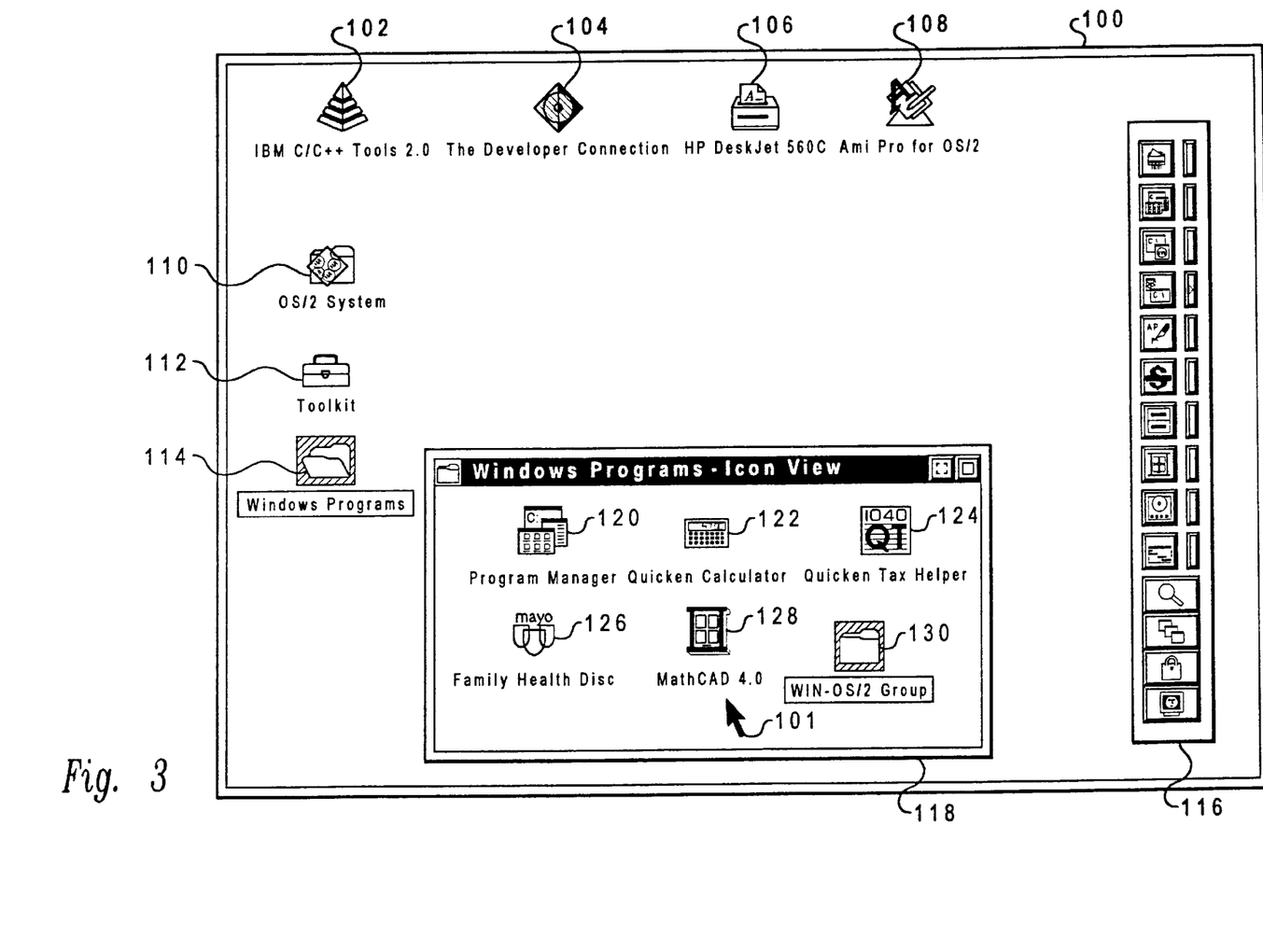
FIG. 3 depicts a standard graphical user interface employed by the data processing system's operating system in accordance with a preferred embodiment of the present invention.

Referring now to FIG. 3, there is depicted a standard GUI employed by the data processing system's operating system. Background desktop 100 displayed to a user within display device 14 includes a plurality of user-selectable icons 102–116. Each icon 102–116 represents an application, function or file storage area which a user can conveniently select utilizing graphical pointer 101 by double-clicking the left button of mouse 18. When a user selects one of icons 102–116, the function corresponding to the selected icon is activated and the selected icon is highlighted. Many of icons 102–116 have an associated window or series of windows which are displayed when the icon is selected. For example, as seen in FIG. 3, when Windows Programs icon 114 is selected, window 118 is displayed to the user to provide further possible selections (i.e., icons 121–130).

Figure 4:
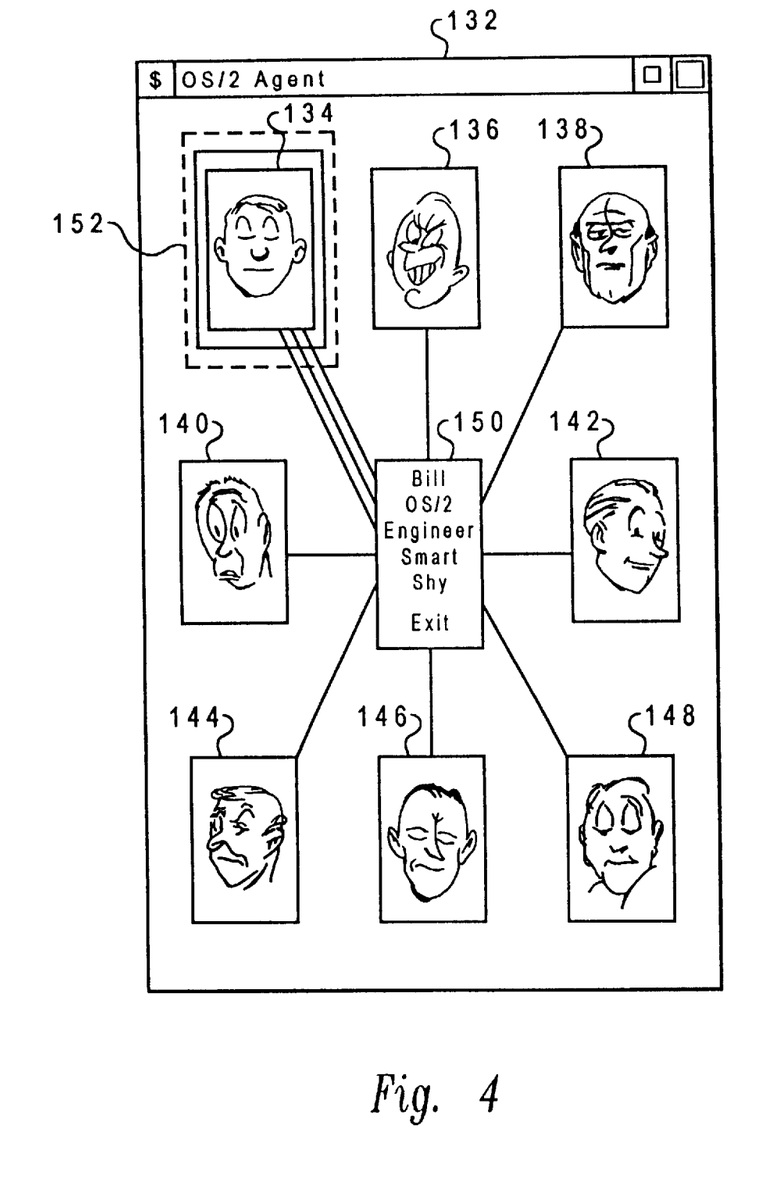
FIG. 4 shows a window that provides a rehearsal control of available OS/2 agents, in accordance with a preferred embodiment of the present invention.

Referring now to FIG. 4, there is shown a window 132 that is displayed within background desktop 100 that provides a Rehearsal Control of available Configuration Agents, in accordance with a preferred embodiment of the present invention. Window 132 shows each of the available configuration agents that may be selected by the user. Each Configuration Agent represents a configuration or format for the operating system's GUI. Window 132 is considered the Rehearsal Control window because it allows a user to "rehearse" a particular system configuration before actually reconfiguring the system GUI.

Each system Configuration Agent is represented in window 132 by an animated display object 134–148. As can be seen, all animated display objects 134–148 are displayed to the user simultaneously within window 132. To indicate to the user the type of configuration associated with a particular agent, each display object is shown with an animated (human) face indicating the type of mood or "feel" for the system configuration generated by that particular agent. When the animated display object is highlighted within the Rehearsal Control (i.e. window 132), a multimedia presentation for the agent is played for the user. This multimedia presentation may include sound and/or video and/or graphics that conveys an expression of the interface for the configuration that would be provided.

A descriptive area 150 may also be provided in a preferred embodiment. The descriptive area 150 provides a description of the highlighted agent to better identify characteristics of the highlighted agent. For example, a computer may be used by a number of users. The system configuration agents 134–148 might represent eight different users of the computer. An agent would be identified with a user, by his picture, for example, and its configuration set to the preferred configuration of that user. Thus, as seen in FIG. 4, agent 134 is shown to have an identifying description in area 150 indicated as belonging to "Bill", operating in "OS/2", for a "Smart, Shy, Engineer". In one embodiment, the multimedia presentation is an animated human that acts "nervous" or "excited", is very outgoing, and so on, thereby indicating the personality of the particular agent. The text "Exit" identifies a position where the user may exit the Resource Control.

In a preferred embodiment, a highlighted agent will have an associated multimedia presentation played in the area of window 132 occupied by that agent. Thus, when the multimedia presentation of agent 134 is played, the visual portion of the multimedia presentation would occupy only area 152 of window 132. In this way, agents 136–148 continue to be displayed to the user during the multimedia presentation for agent 134. In an alternative preferred embodiment of the present invention, the multimedia presentation for an agent may occupy the entire window 132, or even the entire cathode ray tube, while being played, thereby preventing all animated display objects being shown during the multimedia presentation. For example, if each agent 134–148 represented a different color scheme for the GUI, it might be desirable to have the multimedia presentation occupy the entire display to better provide an example of that agents configuration. However, once the multimedia presentation was complete, the display would return to the Rehearsal Control with all agents displayed. As an alternative example, each agent may represent a different U.S. city, and the multimedia presentation provides a video showing and describing that city.

As can be seen, the present invention provides a Rehearsal Control for software agents that enables a user to very quickly evaluate each agent's behavior and to perceive all available agents side by side. Also, the user can very quickly replay a selected agent.

In a preferred embodiment, two timers would be maintained for the Rehearsal Control. Initially, the Rehearsal Control would initially highlight a default agent in window 132 and play its multimedia presentation, thereby introducing the agent to the user. A first timer in the Rehearsal Control would time the playback of the multimedia presentation, and a second timer would time the highlight of the agent. Once the first timer expires, the presentation ends. When the second timer expires, a "dialer" is automatically moved to highlight another agent in the window, both timers are started, and the associated multimedia presentation is played. This process will repeat, moving the dialer from one agent to the next following a clockwise direction. The movement of the dialer will stop once the user selects one of the agents (with a mouse click or by hitting the enter key) on the agent pointed to by the dialer (the highlighted agent).

Figure 5:
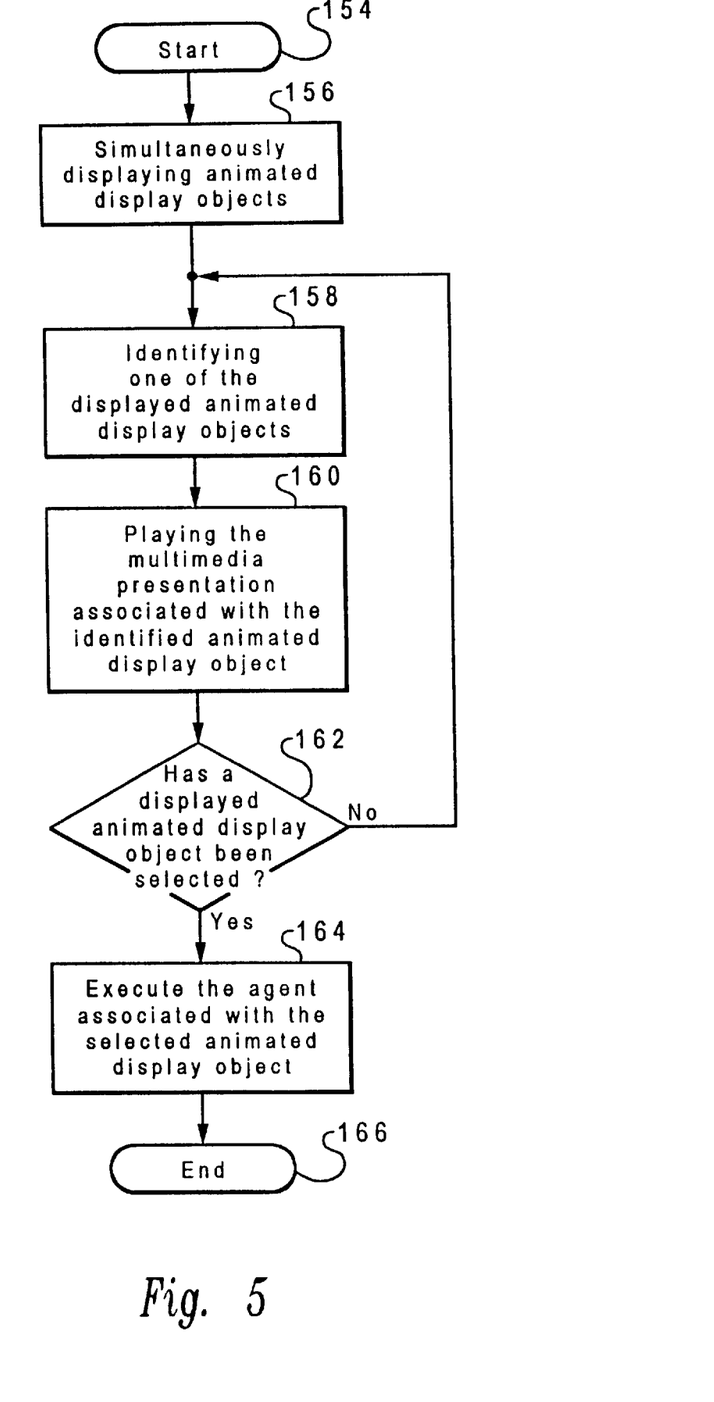
FIG. 5 shows a flow diagram of the method for presenting a plurality of animated display objects to a user for selection on a graphical user interface of a data processing system, in accordance with a preferred embodiment of the present invention.

Referring now to FIG. 5, there is shown a flow diagram of the method for presenting a plurality of animated display objects to a user for selection on a graphical user interface of a data processing system, in accordance with a preferred embodiment of the present invention. The process begins at step 154 and proceeds to step 156, where a plurality of animated display objects are simultaneously displayed on the video display of the computer system. At step 158, one of the displayed animated display objects is identified or highlighted, such as by a default setting or a user selection. At step 160, a multimedia presentation associated with the identified animated display object is played for the user. In a preferred embodiment, this multimedia presentation animates a displayed human face in an area such as area 152 to indicate to the user the skills and personality of the associated graphical user interface. For example, an interface for a highly skilled and relatively impatient user would provide simple, quick tools without any associated guidance or help features. The animated display object and associated multimedia presentation for such an interface might show the face of an engineer speaking about not wanting to wait for the interface to perform functions.

The process then proceeds to decision block 162 to determine whether the identified animated display object has been selected by the user by means such as a mouse. If the user has not selected one of the displayed animated display objects, the process returns to step 158 where another one of the displayed animated display objects is identified by, for example, the Resource Control automatically identifying another displayed animated display object. If a displayed animated display object has been selected, the process proceeds from decision block 162 to step 164 where the software agent associated with the selected animated display object is executed. Thereafter, the process ends at step 166.

While the present invention has been described as a control for presenting allowable GUIs, the present invention is applicable to any resource control for presenting and selecting from a number of displayable agents. Thus, it will be appreciated that this type of control will be useful with any group of animated objects (bitmaps, icons, multimedia movies, and so on) where the user is asked to selected one from many. While the invention has been particularly shown and described with reference to a preferred embodiment, it will be understood by those skilled in the art that various changes in form and detail may be made therein without departing from the spirit and scope of the invention.

What is claimed is:

1. A method for presenting animated display objects to a user for selection on a graphical user interface of a data processing system, wherein the graphical user interface is displayed on a display device of the data processing system, the method comprising the steps of:

simultaneously displaying a plurality of animated display objects that each represent a configuration of the graphical user interface, thus allowing the user to view all of the plurality of animated display objects and make a selection of one of the plurality of animated display objects, wherein each one of the plurality of animated display objects is associated with a multimedia presentation;

identifying one of the displayed animated display objects;

playing the associated multimedia presentation for the identified animated display object;

selecting one of the displayed animated display objects; and executing a software agent associated with the selected animated display object to configure the graphical user interface into the configuration represented by the selected animated display object.

2. A method for presenting animated display objects to a user for selection on a graphical user interface of a data processing system according to claim 1, wherein each multimedia presentation describes the skills and personality of the associated animated display object.

3. A method for presenting animated display objects to a user for selection on a graphical user interface of a data processing system according to claim 2 wherein each animated display object is a human face and playing a multimedia presentation comprises animating the human face of the associated animated display object.

4. A method for presenting animated display objects to a user for selection on a graphical user interface of a data processing system according to claim 1, wherein each multimedia presentation describes the display layout and color scheme of the associated graphical user interface.

5. A method for presenting animated display objects to a user for selection on a graphical user interface of a data processing system according to claim 1, wherein the step of selecting one of the plurality of animated display objects further comprises playing the multimedia presentation associated with the selected animated display object.

6. A method for presenting animated display objects to a user for selection on a graphical user interface of a data processing system according to claim 1, wherein at least a portion of the plurality of animated display objects are displayed during the step of playing the associated multimedia presentation.

7. A method for presenting animated display objects to a user for selection on a graphical user interface of a data processing system according to claim 1, wherein each animated display object has an exclusive display area on the display device and each multimedia presentation includes a graphical display to a display area on the display device that does not include the exclusive display area of any animated display object except its associated animated display object.

8. A method for presenting animated display objects to a user for selection on a graphical user interface of a data processing system according to claim 1, wherein each multimedia presentation is played for a predetermined time.

9. A data processing system for presenting animated display objects to a user for selection on a graphical user interface of the data processing system, wherein the graphical user interface is displayed on a display device of the data processing system, the data processing system comprising:

means for simultaneously displaying a plurality of animated display objects that each represent a configuration of the graphical user interface, thus allowing the user to view all of the plurality of animated display objects and make a selection of one of the plurality of animated display objects, wherein each one of the plurality of animated display objects is associated with a multimedia presentation;

means for identifying one of the displayed animated display objects;

means for playing the associated multimedia presentation for the identified animated display object;

means for selecting one of the displayed animated display objects; and means for executing a software agent associated with the selected animated display object to configure the graphical user interface into the configuration represented by the selected animated display object.

10. A data processing system for presenting animated display objects to a user for selection on a graphical user interface of the data processing system according to claim 9, wherein each multimedia presentation describes the skills and personality of the associated animated display object.

11. A data processing system for presenting animated display objects to a user for selection on a graphical user interface of the data processing system according to claim 10, wherein each animated display object is a human face and means for playing a multimedia presentation comprises means for animating the human face of the associated animated display object.

12. A data processing system for presenting animated display objects to a user for selection on a graphical user interface of the data processing system according to claim 9, wherein each multimedia presentation describes the display layout and color scheme of the associated graphical user interface.

13. A data processing system for presenting animated display objects to a user for selection on a graphical user interface of the data processing system according to claim 9, wherein means for selecting one of the plurality of animated display objects further comprises means for playing the multimedia presentation associated with the selected animated display object.

14. A data processing system for presenting animated display objects to a user for selection on a graphical user interface of the data processing system according to claim 9, further comprising means for displaying at least a portion of the plurality of animated display objects during the playing of the associated multimedia presentation.

15. A data processing system for presenting animated display objects to a user for selection on a graphical user interface of the data processing system according to claim 9, wherein each animated display object has an exclusive display area on the display device and each multimedia presentation includes a graphical display to a display area on the display device that does not include the exclusive display area of any animated display object except its associated animated display object.

16. A data processing system for presenting animated display objects to a user for selection on a graphical user interface of the data processing system according to claim 9, wherein each multimedia presentation is played for a predetermined time.

17. A computer program product for presenting animated display objects to a user for selection on a graphical user interface of a data processing system, wherein the graphical user interface is displayed on a display device of the data processing system, comprising:

a computer usable medium having computer readable program code means embodied in the medium for presenting animated display objects, the computer program product having:

computer readable program code means for simultaneously displaying a plurality of animated display objects that each represent a configuration of the graphical user interface, thus allowing the user to view all of the plurality of animated display objects and make a selection of one of the plurality of animated display objects, wherein each one of the plurality of animated display objects is associated with a multimedia presentation;

computer readable program code means for identifying one of the displayed animated display objects;

computer readable program code means for playing the associated multimedia presentation for the identified animated display object;

computer readable program code means for selecting on the displayed animated display objects; and computer readable program code means for executing a software agent associated with the selected animated display object to configure the graphical user interface into the configuration represented by the animated display object.

18. A computer program product for presenting animated display objects to a user for selection on a graphical user interface of the data processing system according to claim 17, wherein each multimedia presentation describes the skills and personality of the associated animated display object.

19. A computer program product for presenting animated display objects to a user for selection on a graphical user interface of the data processing system according to claim 18, wherein each animated display object is a human face and computer readable program code means for playing a multimedia presentation comprises computer readable program code means for animating the human face of the associated animated display object.

20. A computer program product for presenting animated display objects to a user for selection on a graphical user interface of the data processing system according to claim 17, wherein each multimedia presentation describes the display layout and color scheme of the associated graphical user interface.

21. A computer program product for presenting animated display objects to a user for selection on a graphical user interface of the data processing system according to claim 17, wherein computer readable program code means for selecting one of the plurality of animated display objects further comprises computer readable program code means for playing the multimedia presentation associated with the selected animated display object.

22. A computer program product for presenting animated display objects to a user for selection on a graphical user interface of the data processing system according to claim 17, further comprising computer readable program code means for displaying at least a portion of the plurality of animated display objects during the playing of the associated multimedia presentation.

23. A computer program product for presenting animated display objects to a user for selection on a graphical user interface of the data processing system according to claim 17, wherein each animated display object has an exclusive display area on the display device and each multimedia presentation includes a graphical display to a display area on the display device that does not include the exclusive display area of any animated display object except its associated animated display object.

24. A computer program product for presenting animated display objects to a user for selection on a graphical user interface of the data processing system according to claim 17, wherein each multimedia presentation is played for a predetermined time.

\* \* \* \* \*